(12) United States Patent
Choi

(10) Patent No.: US 7,213,792 B2
(45) Date of Patent: May 8, 2007

(54) HEIGHT ADJUSTABLE AND PIVOTABLE MONITOR ASSEMBLY

(75) Inventor: Hyun-yong Choi, Chuncheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 11/147,160

(22) Filed: Jun. 8, 2005

(65) Prior Publication Data

US 2006/0038092 A1    Feb. 23, 2006

(30) Foreign Application Priority Data

Aug. 18, 2004   (KR) ...................... 10-2004-0065182

(51) Int. Cl.
*E04G 3/00*    (2006.01)
(52) U.S. Cl. .................... 248/279.1; 248/920
(58) Field of Classification Search ............ 248/276.1, 248/278.1, 279.1, 146, 917, 919, 920, 921, 248/922, 923
See application file for complete search history.

(56) References Cited

U.S. PATENT DOCUMENTS 6,007,038 A  * 12/1999 Han ........................ 248/371
6,027,085 A  *  2/2000 Ruther .................... 248/187.1
7,099,150 B2 *  8/2006 Lee ............................ 361/683
2004/0011932 A1*  1/2004 Duff ........................... 248/157
2004/0011938 A1*  1/2004 Oddsen, Jr. ................. 248/393
2004/0113031 A1*  6/2004 Sung ........................... 248/146

FOREIGN PATENT DOCUMENTS

| KR | 20-250276 | 9/2001 |
|---|---|---|
| KR | 20-304340 | 2/2003 |
| KR | 20-310878 | 4/2003 |
| KR | 20-338354 | 1/2004 |
| KR | 2004-400 | 1/2004 |

* cited by examiner

*Primary Examiner*—Ramon O Ramirez
(74) *Attorney, Agent, or Firm*—Stanzione & Kim, LLP

(57) ABSTRACT

A monitor having a monitor body to form a picture thereon and a base member to support the monitor body includes a tilting unit provided between the monitor body and the base member to tiltably support the monitor body with respect to the base member, a pivoting unit provided between the monitor body and the tilting unit to pivotably support the monitor body with respect to the base member, and a slide supporting part provided between the pivoting unit and the tilting unit to slidably support the pivoting unit with respect to the tilting unit when the monitor body is pivoted with respect to the base member. Thus, the monitor can prevent a collision between the monitor body and the base member when the monitor body is pivoted with respect to the base member.

20 Claims, 13 Drawing Sheets

HEIGHT ADJUSTABLE AND PIVOTABLE MONITOR ASSEMBLY

CROSS-REFERENCE TO RELATED APPLICATIONS

This application claims the benefit of Korean Patent Application No. 2004-65182 filed on Aug. 18, 2004, in the Korean Intellectual Property Office, the disclosure of which is incorporated herein in its entirety by reference.

BACKGROUND OF THE INVENTION

1. Field of the Invention

The present general inventive concept relates to a monitor, and more particularly, to a monitor in which a collision between a monitor body and a base member can be prevented.

2. Description of the Related Art

Generally a monitor comprises a monitor body forming a picture thereon and a base member seated on an installation face, such as a table, to support the monitor body. Here, the monitor collectively refers to all devices capable of forming pictures thereon, such as a TV, a monitor for a computer, and the like, which mainly employ a thin plate shaped (display) panel, such as an LCD (liquid crystal display) or a PDP (plasma display panel).

A conventional monitor disclosed in Korean Patent First Publication No. 2004-4000 comprises a monitor body forming a picture thereon, a stand supporting the monitor body, a tilting hinge provided between the monitor body and the stand to tiltably support the monitor body with respect to the stand, a pivoting hinge provided between the monitor body and the stand to pivotably support the monitor body with respect to the stand, and a hinge assembly provided between the monitor body and the stand and having a swiveling hinge so that the stand swivelably supports the monitor body.

With this configuration, the monitor body is tiltable, pivotable and swivelable relative to the stand, and a single assembly having tilting, pivoting and swiveling operations can be manufactured.

However, the conventional monitor has caused corners of the monitor body to collide with the stand when a user pivots the monitor body with respect to the stand, thereby damaging the monitor body and the stand. To prevent the damage, the monitor body has to be tilted to a predetermined angle backward with respect to the stand and the monitor body has to be pivoted after being tilted away from the stand.

SUMMARY OF THE INVENTION

Accordingly, the present general inventive concept provides a monitor capable of preventing a collision between a monitor body and a base member when the monitor body is pivoted with respect to the base member.

Additional aspects and/or advantages of the general inventive concept will be set forth in part in the description which follows and, in part, will be obvious from the description, or may be learned by practice of the general inventive concept.

The foregoing and/or other aspects and advantages of the present general inventive concept may be achieved by providing a monitor having a monitor body to form a picture thereon and a base member to support the monitor body, the monitor comprising a tilting unit provided between the monitor body and the base member to tiltably support the monitor body with respect to the base member, a pivoting unit provided between the monitor body and the tilting unit to pivotably support the monitor body with respect to the base member, and a slide supporting part provided between the pivoting unit and the tilting unit to slidably support the pivoting unit with respect to the tilting unit when the monitor body is pivoted with respect to the base member.

The pivoting unit may comprise a pivoting shaft coupled to the tilting unit and a pivoting bracket, one side of which is coupled to the monitor body and the other side of which is rotatably coupled to the pivoting shaft.

The slide supporting part may include a pivoting shaft accommodating hole formed on the tilting unit to accommodate the pivoting shaft therein, the pivoting shaft accommodating hole being elongated.

A plurality of recesses and protrusions may be provided radially in the pivoting bracket, and the monitor may further comprise a roller provided in the tilting unit to contact the recesses and the protrusions so as to slidably support the pivoting shaft to the pivoting shaft accommodating hole.

The tilting unit may comprise a first tilting bracket coupled to the base member, a second tilting bracket coupled to the pivoting shaft, on which the pivoting shaft accommodating hole is formed, and a tilting shaft coupled between the first tilting bracket and the second tilting bracket to tiltably support the second tilting bracket with respect to the first tilting bracket.

The monitor may further comprise a guide bracket coupled to the pivoting shaft to slide integrally with the pivoting shaft and to guide the pivoting shaft to the pivoting shaft accommodating hole.

The second titling bracket may be formed with a guide bracket accommodating part provided adjacently to the pivoting shaft accommodating hole to accommodate the guide bracket therein.

The monitor may further comprise a rail provided in one of the guide bracket and the guide bracket accommodating part, and a rail accommodating hole provided in the other of the guide bracket and the guide bracket accommodating part to accommodate the rail therein.

The monitor may further comprise a spring member to provide an elastic force to the pivoting shaft when the pivoting bracket is in contact with the roller.

The recesses and the protrusions may be respectively provided in four, and each recess is formed between adjacent protrusions.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

Figure 1:
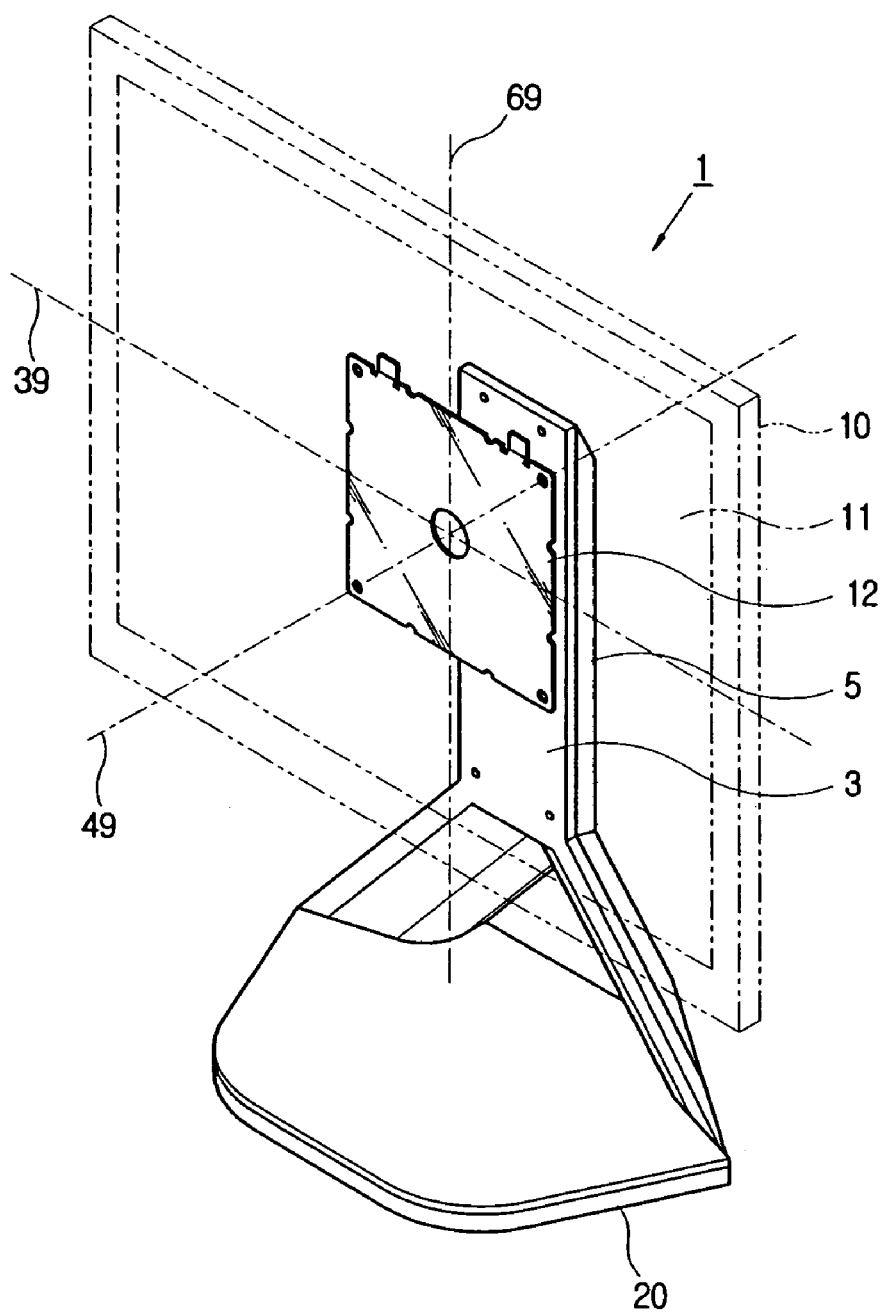
FIG. 1 is a perspective view illustrating a monitor according to an embodiment of the present general inventive concept.
Figure 2:
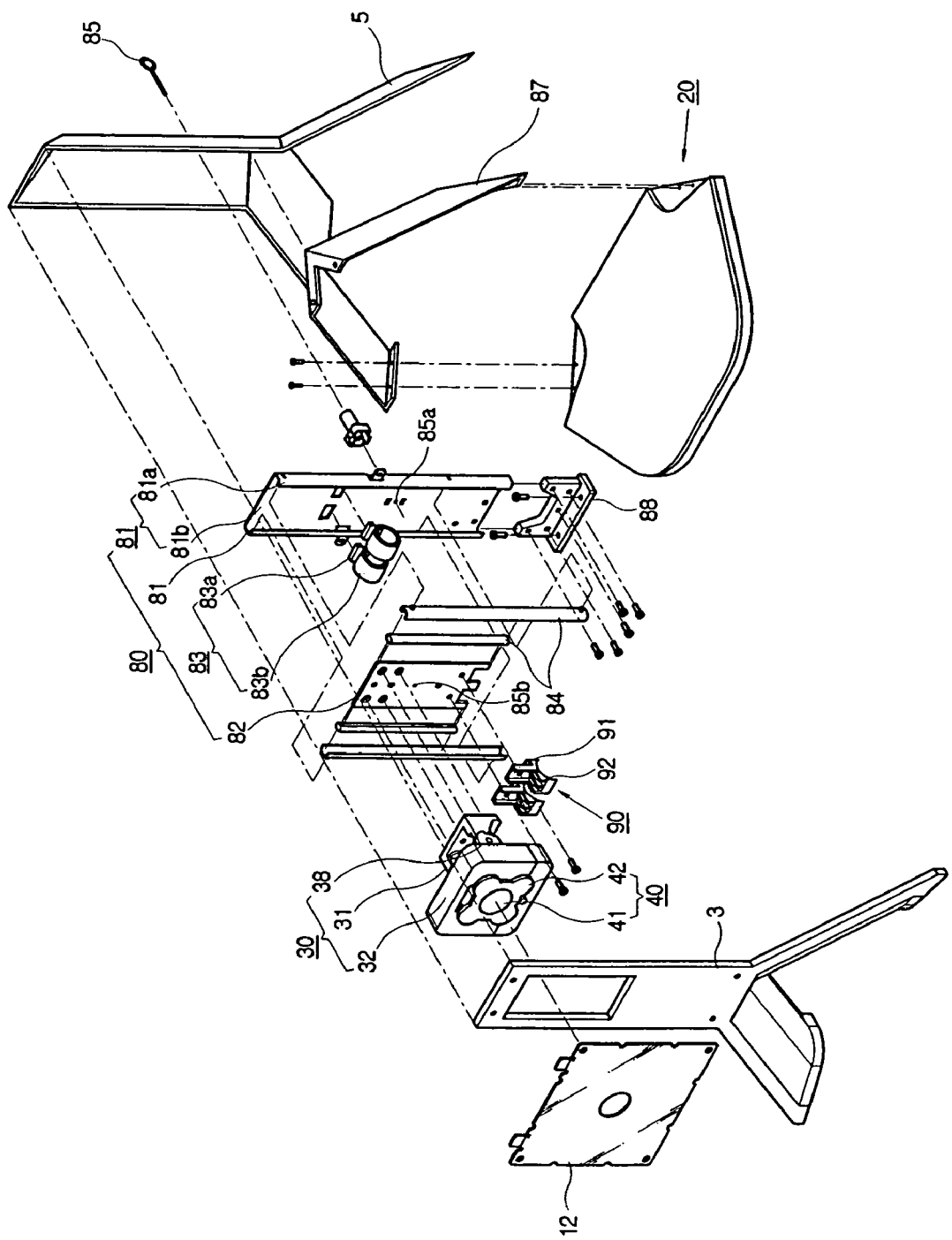
FIG. 2 is an exploded perspective view illustrating the monitor of FIG. 1.
Figure 3:
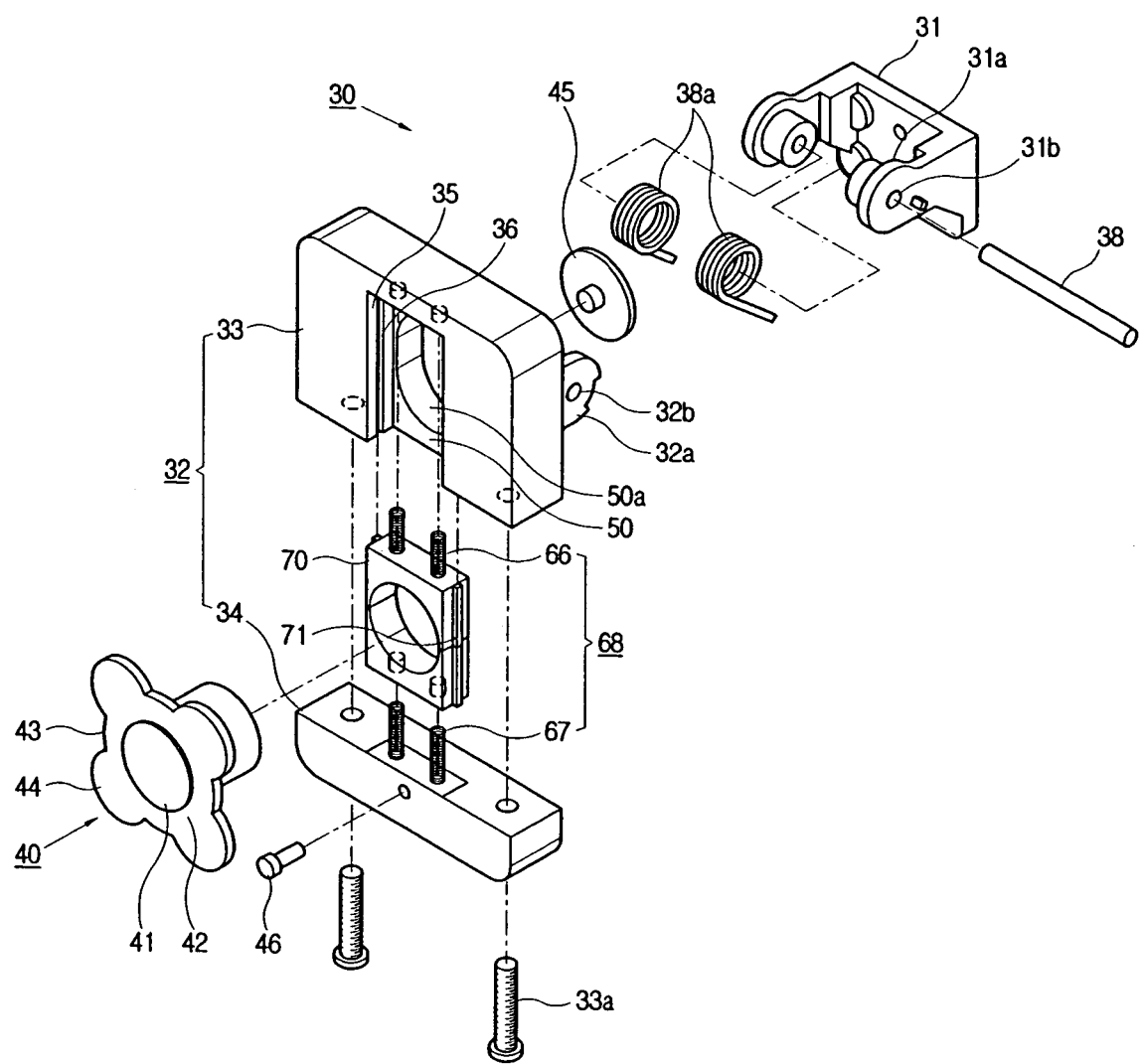
FIG. 3 is an exploded perspective view illustrating a tiling unit and a pivoting unit of the monitor of FIG. 2.
Figure 4:
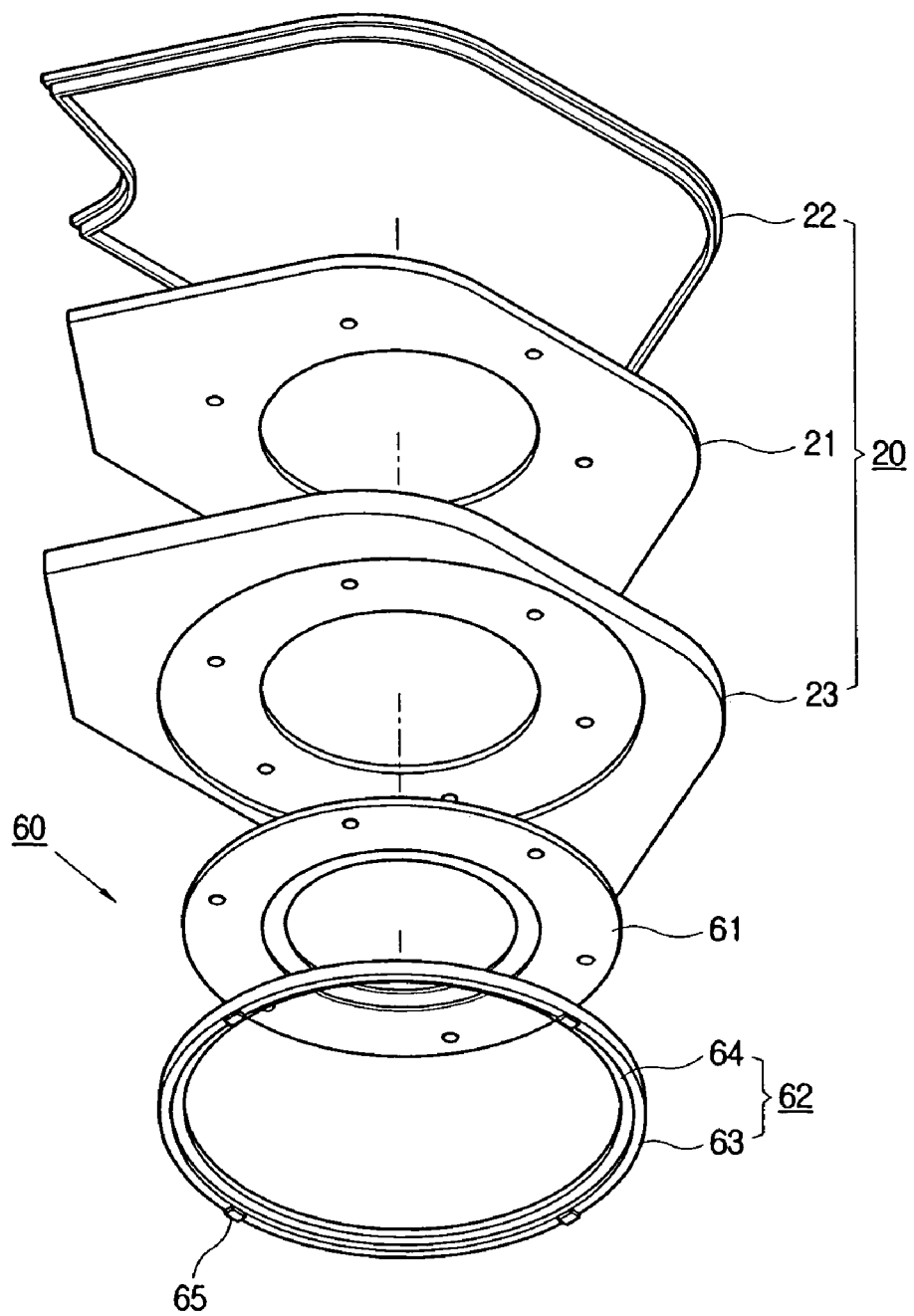
FIG. 4 is an exploded perspective view illustrating a swiveling unit of the monitor of FIG. 2.

DETAILED DESCRIPTION OF THE
PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIGS. 1 through 4, illustrate a monitor 1 according to an embodiment of the present general inventive concept. Referring to FIGS. 1–4, the monitor 1 comprises a monitor body 10 to form a picture thereon, a base member 20 to support the monitor body on an installation face, such as a table, a tilting unit 30 provided between the monitor body 10 and the base member 20 to tiltably support the monitor body 10 with respect to the base member 20, and a pivoting unit 40 provided between the monitor body 10 and the tiling unit 30 to pivotably support the monitor body 10 with respect to the base member 20 or the tilting unit 30. The monitor 1 includes a slide supporting part 50 to slidably support the pivoting unit 40 with respect to the tilting unit 30 or the base member 20 when the monitor body 10 is pivoted with respect to the base member 20. The monitor 1 can further include a swiveling unit 60 coupled to the base member 20 so that the monitor body 10 is swivelable with respect to the installation face, and an elevating unit 80 provided between the tilting unit 30 and the base member 20 so that the monitor body 10 can elevate with respect to the base member 20. The monitor 1 may further include a front cover 3 provided in front of the units 30, 40, 60 and 80 between the monitor body 10 and the base member 20 and a rear cover 5 provided behind the units 30, 40, 60 and 80.

The monitor body 10 can be equipped with a plate-shaped picture panel 11 such as an LCD (liquid crystal display) or a PDP (plasma display panel). A monitor bracket 12 to support the monitor body 10 is provided on a back face of the monitor body 10.

The base member 20 can be plate-shaped so as to be disposed on the installation face, such as the table. The base member 20 can comprise a base frame 21 coupled to a frame support stand 87 of the elevating unit 80 to be described later to support the elevating unit 80, an upper base cover 22 provided on a top portion of the base frame 21, and a lower base cover 23 provided on a bottom portion of the base frame 21. The swiveling unit 60 can be provided in a lower part of the base member 20.

The base frame 21 can be plate-shaped and made with a metal material so as to be as strong as necessary to support the monitor body 10. The upper base cover 22 and the lower base cover 23 can be molded with a plastic injection but they may be made with various materials including aluminum so as to shape an external appearance thereof. The base frame 21, the upper base cover 22, and the lower base cover 23 can be integrally coupled using screws (not shown). The installation face on which the base member 20 is installed can be a horizontal plane, like the table. However, the installation face can also be a wall face or a ceiling.

The swiveling unit 60 can be provided in the lower part of the base member 20 to swivel the monitor body 10 with respect to the installation face around a line 69 (see FIG. 1). The swiveling unit 60 includes a swivel member 61 rotatably coupled to a bottom face of the base member 20, and a swivel support stand 62, one side of which is supported by the installation face and another side of which is slidably provided in the swivel member 61 and the base member 20 to swivelably support the swivel member 61. The swiveling unit 60 may be disposed between the base member 20 and the installation face.

The swivel member 61 is coupled to a bottom face of the lower base cover 23 of the base member 20. The swivel member 61 can be circular plate-shaped. Between the swivel member 61 and the lower base cover 23 is formed a space within which an upper support stand part 64 of the swivel support stand 62 can be accommodated.

The swivel support stand 62 includes a lower support stand part 63 to contact the installation face, such as the table, and the upper support stand part 64 provided above the lower support stand part 63, and extending so as to be inserted between the swivel member 61 and the lower base cover 23. The swivel support stand can be circular plate-shaped. On a bottom face of the lower support stand part 63 can be provided a contact pad 65 to prevent noise and slippage when in contact with the installation face. As described above, the swivel member 61 coupled to the base member 20 is swivelable with respect to the swivel support stand 62.

The tilting unit 30 is provided between the elevating unit 80 and the pivoting unit 40 to enable the monitor body 10 to tilt with respect to the base member 20 around a line 39 (see FIG. 1). The tilting unit 30 includes a first tilting bracket 31 coupled to the base member 20 through the elevating unit 80, a second tilting bracket 32 coupled to the pivoting unit 40, a titling shaft 38 coupled to the first tilting bracket 31 and the second tilting bracket 32 to support the second tilting bracket 32 to tilt with respect to the first tilting bracket 31. The tilting unit 30 can further include a torsion coil string 38a coupled to the first tilting bracket 31 and the second tilting bracket 32.

The first tilting bracket 31 can be plate-shaped. The first tilting bracket 31 is coupled to an elevating member 82 of the elevating unit 80 to thereby slide together with the elevating member 82. The first tilting bracket 31 includes a first tilting shaft coupling part 31a protruding toward the second tilting bracket 32, and having a first shaft inserting hole 31b, through which the tilting shaft 38 is inserted.

The second tilting bracket 32 can be substantially square-shaped, and includes a second titling shaft coupling part 32a protruding toward the first tilting bracket 31, and having a second shaft inserting hole 32b, through which the tilting shaft 32b is inserted. The second tilting bracket 32 is separated into an upper tilting bracket 33 and a lower tilting bracket 34 so as to accommodate a guide bracket 70 to be described later therein. The upper tilting bracket 33 and the lower tilting bracket 34 can be coupled together by screws 33a. On a plane of the second tilting bracket 32 are formed a slide supporting part 50 and a guide bracket accommodating part 35 provided adjacently to the slide supporting part 50 to accommodate a guide bracket 70 to be described later therein.

The tilting shaft 38 is inserted into the first shaft inserting hole 31b and the second shaft inserting hole 32b to thereby tiltably couple the second tilting bracket 32 with the first tilting bracket 31. The tilting shaft 38 can be press-fitted to be inserted into the first shaft inserting hole 31b and the second shaft inserting hole 32b to thereby produce a friction force when the second tilting bracket 32 is tilted with respect to the first tilting bracket 31. The friction force can have a strength such that a user can suppress the force easily only with a small force.

The pivoting unit 40 is provided between the monitor body 10 and the tilting unit 30, to enable the monitor body 10 to pivot with respect to the base member 20 around a line 49 (see FIG. 1). The pivoting unit 40 includes a pivoting shaft 41 coupled to the tilting unit 30, and a pivoting bracket 42, one side of which is coupled to the monitor body 10 and another side of which is rotatably coupled to the pivoting shaft 41.

The pivoting bracket 42 rotates integrally with the monitor body 10 relative to the pivoting shaft 41 when the monitor body 10 pivots with respect to the base member 20.

Monitor 1 further includes the guide bracket 70 coupled to the pivoting shaft 41 to slide integrally with the pivoting shaft 41 and to guide the pivoting shaft to a pivoting shaft accommodating hole 50a.

The guide bracket 70 slidably moves integrally with the pivoting shaft 41 with respect to the second tilting bracket 32, and is accommodated in the guide bracket accommodating part 35 formed on the second tilting bracket 32. The guide bracket accommodating part 35 can be sized so that the guide bracket 70 can be moved vertically together with the pivoting shaft 41.

On both sides of the guide bracket 70 can be provided protruding rails 71. Rail accommodating grooves 36 to accommodate the rails 71 therein can be depressed in the guide bracket accommodating part 35 corresponding to the rails 71. Accordingly, as the rails 71 are slid along the rail accommodating grooves 36, the guide bracket 70 can be slid within the guide bracket accommodating part 35. The rails 71 and the rail accommodating grooves 36 can prevent the pivoting shaft 41 from being detached from the pivoting shaft accommodating hole 50a to be described later.

The slide supporting part 50 is formed on the tilting unit 30 and includes the pivoting shaft accommodating hole 50a to accommodate the pivoting shaft 41 therein. The pivoting shaft accommodating hole 50a is elongated on the plane of the second tilting bracket 32, and thus, the pivoting shaft 41 can be slid vertically within the pivoting shaft accommodating hole 50a. A detachment preventing member 45 can be further included in the rear space of the pivoting shaft accommodating hole 50a, and is coupled to the pivoting shaft 41 to thereby prevent the pivoting shaft 41 from being detached from the pivoting shaft accommodating hole 50a.

The monitor 1 further includes a plurality of recesses 43 and protrusions 44 radially provided in the pivoting bracket 42, and a roller 46 provided in the tilting unit 30 to contact the recesses 43 and the protrusions 44 to support the pivoting shaft 41 to slide with respect to the pivoting shaft accommodating hole 50a. The protrusions 44 can be arc-shaped and four protrusions 44 can be provided along a circumferential direction of the pivoting bracket 42. Arc-shaped recesses 43 can be provided between the protrusions 44. An angle between adjacent protrusions can be 90° and an angle between a protrusion and an adjacent recess can be 45°. Here, the number of and the angle between the recesses 43 and the protrusions 44 are not limited as described and may be variously modified.

The monitor 1 further includes a spring member 68 to provide an elastic force to the pivoting shaft 41 when the pivoting bracket 42 is in contact with the roller 46.

The spring member 68 can be formed with a coil spring, including a first pair of coil springs 66 mounted on a top portion of the guide bracket 70 and a second pair of coil springs 67 mounted on a bottom portion of the guide bracket 70.

The elevating unit 80 is provided between the base member 20 and the tilting unit 30. The elevating unit 80 allows the monitor body 10 to slide vertically with respect to the base member 20. The elevating unit 80 includes a guide frame 81 connected to the frame supporting stand 87 through a support bracket 88 and installed vertically with respect to the base member 20, an elevating member 82 slidably provided at the guide frame 81 and coupled to the monitor body 10, and an elastic member 83 provided between the guide frame 81 and the elevating member 82 to upwardly press the elevating member 82 with respect to the guide frame 81. The elevating unit 80 can further include an auxiliary guide member 84 of a soft material provided between the guide frame 81 and the elevating member 82 to guide the elevating member 82 to be elevated elevating unit 80 can further include a stopper 85 to lock the guide frame 81 and the elevating member 82 together to prevent the elevating member 82 from sliding with respect to the guide frame 81.

A lower side of the guide frame 81 is coupled to the base frame 21 to support the elevating member 82 to slide vertically. The guide frame 81 can have a pair of guide parts 81a being shaped with ⊏, both of which are opposite to each other to guide both sides of the elevating member 82, and a plane part 81b to connect the pair of guide parts 81a. The frame supporting stand 87 of a triangular shape can be provided between the guide frame 81 and the base member 20 to support the guide frame 81 to the base member 20. The support bracket 88 can be further provided between the guide frame 81 and the frame supporting stand 87 to enhance a coupling force therebetween.

A top portion of the support bracket 88 can be coupled to a bottom portion of the guide part 81a of the guide frame 81 and a bottom portion of the support bracket 88 can be coupled to a top face of the frame supporting stand 87.

The top face of the frame supporting stand 87 can be coupled to the support bracket 88 and a bottom face of the frame supporting stand 87 can be branched into two sides at a predetermined angle from the top face thereof, and coupled to the base frame 21. As described above, the frame supporting stand 87 is coupled to the guide frame 81 and the base member 20 in the shape of triangle to thereby support the guide frame 81 securely.

The elevating member 82 can be plate-shaped, and both sides thereof are slidably coupled to the guide frame 81. The first tilting bracket 31 can be coupled to an upper space of the elevating member 82 by screws and the like and a guide coupling part 91 of the spring guide 90 can be coupled to a lower space of the elevating member 83 by screws and the like. Accordingly, the elevating member 82 can elevate vertically due to a force of a user.

One side of the elastic member 83 can be coupled to the guide frame 81 and the elastic member 83 can comprise a spiral spring to contact the elevating member 82. Alternatively, the elastic member 83 may be different kinds of elastic bodies, such as a coil spring, a plate spring or a rubber material.

The spiral spring 83 can have a spring coupling part 83a which is bent and coupled to the plane part 81b of the guide frame 81, and a wound part 83b which is wound in the shape of a roll. On the elevating member 82 can be provided a spring guide 90 to contact the wound part 83b to elevate the elevating member 82 due to an elastic force of the wound part 83b. The elastic force of the wound part 83b can have a strength such that the monitor body 10 does not move downward due to its own weight. Namely, the elastic force of the wound part 83b can be substantially similar to the weight of the monitor body 10. Accordingly, the user can easily move the monitor body 10 upward and downward with a small pressing force.

The spring guide 90 has the guide coupling part 91, one side of which is coupled to the elevating member 82, and a spring contacting part 92 formed integrally with the guide coupling part 91 and provided in the shape of an arc so as to contact an area of the wound part 83b of the elastic member 83. Accordingly, the spring guide 90 transfers the elastic force of the wound part 83b to the elevating member 82, and can also transfer a downward force of the user to the wound part 83b.

The stopper 85 locks the guide frame 81 and the elevating member 82 together to thereby prevent the elevating member 82 from being moved with respect to the guide frame 81. The stopper 85 can be shaped as a long and slim bar, and can be inserted into a first stopper coupling part 85a formed on the guide frame 81 and a second stopper coupling part 85b formed on the elevating member 82. The stopper 85 can be inserted from the rear to the front of the guide frame 81.

Operations of the monitor 1 of FIGS. 1–4 will be described below while referring to FIGS. 5 through 10.

Figure 5:
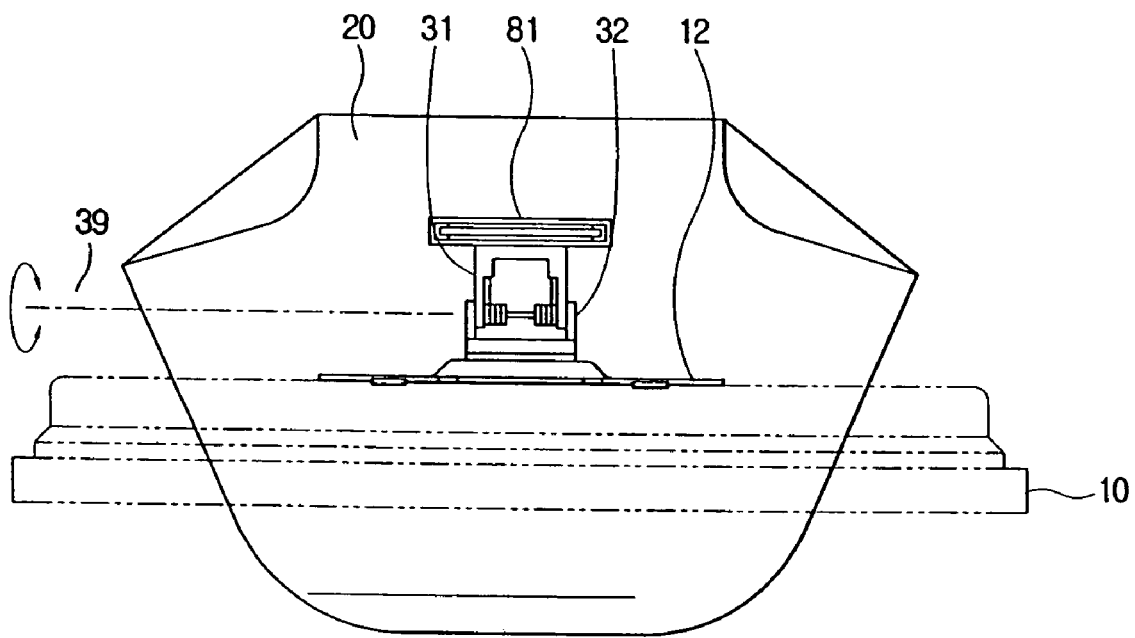
FIG. 5 is a view illustrating a tilting operation of the monitor of FIGS. 1–4.

As illustrated in FIG. 5, a tilting operation of the monitor body 10 with respect to the base member 20 is as follows. When a user presses the monitor body 10 forward and backward, the second titling bracket 32 coupled to the monitor body 10 is rotated with respect to the first tilting bracket 31 forward and backward about the line 39. The user can tilt the monitor body 10 forward, regardless of the weight of the monitor body 10 due to the elastic force of the torsion coil spring 38a. Accordingly, the user may apply a substantially similar force to tilt the monitor body 10 forward and backward.

Figure 6:
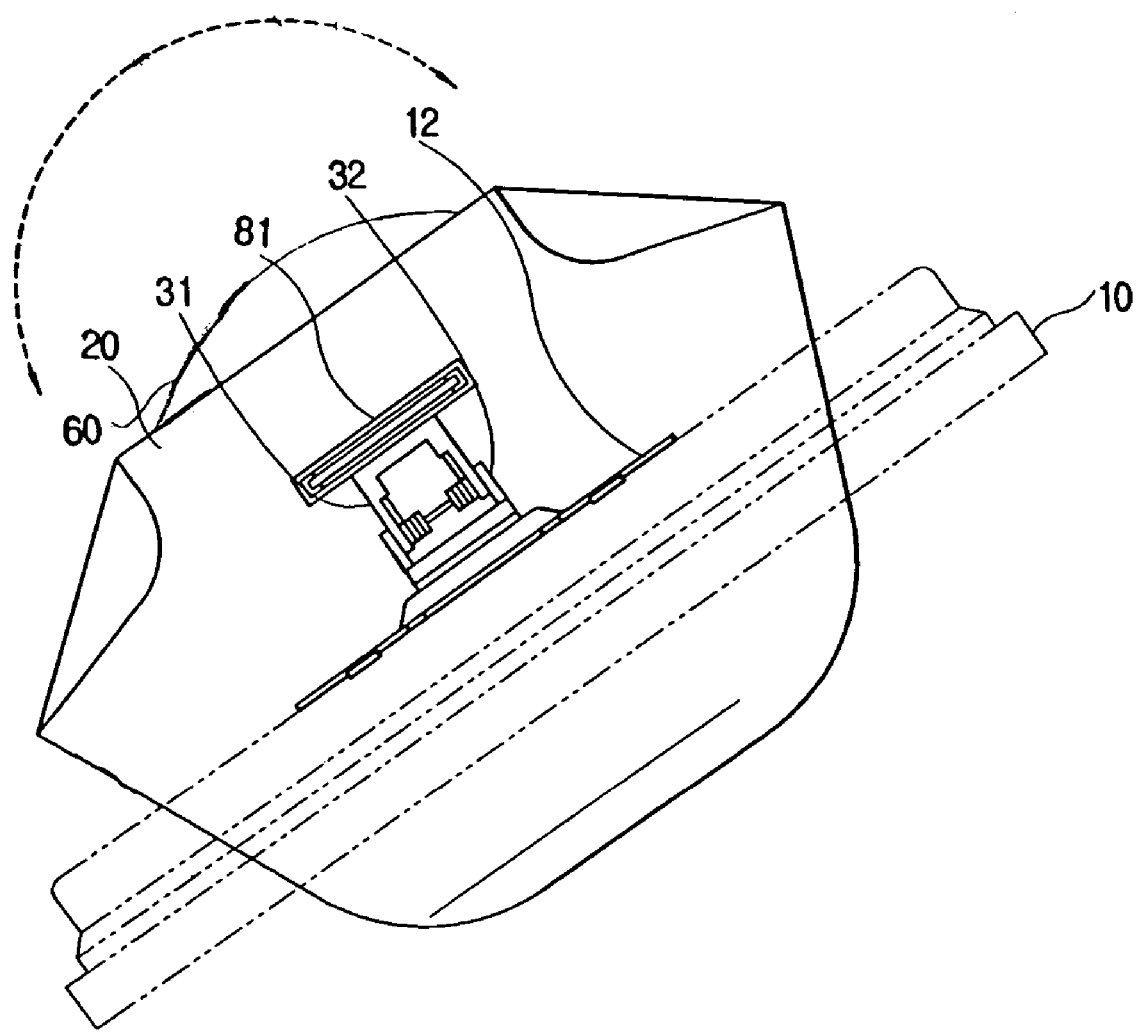
FIG. 6 is a view illustrating a swiveling operation of the monitor of FIGS. 1–4.

As illustrated in FIG. 6, a swiveling operation of the monitor body 10 with respect to the swiveling unit 60 and the installation face is as follows. When the user presses the monitor body 10 so that the monitor body 10 and/or the base member 20 can be rotated about the line 69 (see FIG. 1), the swiveling member 61 coupled to the base member 20 is swiveled with respect to the swiveling support stand 62 in contact with the installation face about the line 69.

Figure 7:
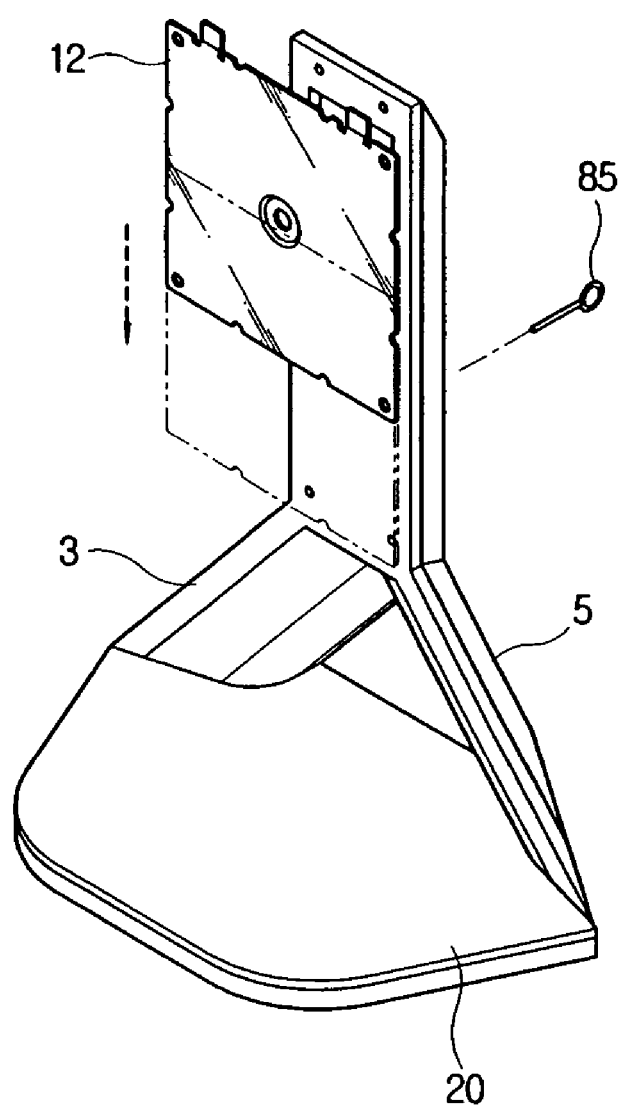
FIG. 7 is a view illustrating an elevating operation of the monitor of FIGS. 1–4.

As illustrated in FIG. 7, an elevating operation of the monitor body 10 with respect to the base member 20 is as follows. When the user presses the monitor body 10 upward and downward, the elevating member 82 coupled to the monitor body 10 slides relative to the guide frame 81 and moves vertically. The user can move the monitor body 10 upward due to the elastic force of the spiral spring 83, regardless of the weight of the monitor body 10. Accordingly, the user can apply a substantially similar force to move the monitory body 10 upward and downward.

As illustrated in FIGS. 8A to 10B, a pivoting operation of the monitor body 10 with respect to the base member 20 is as follows.

Figure 8A:
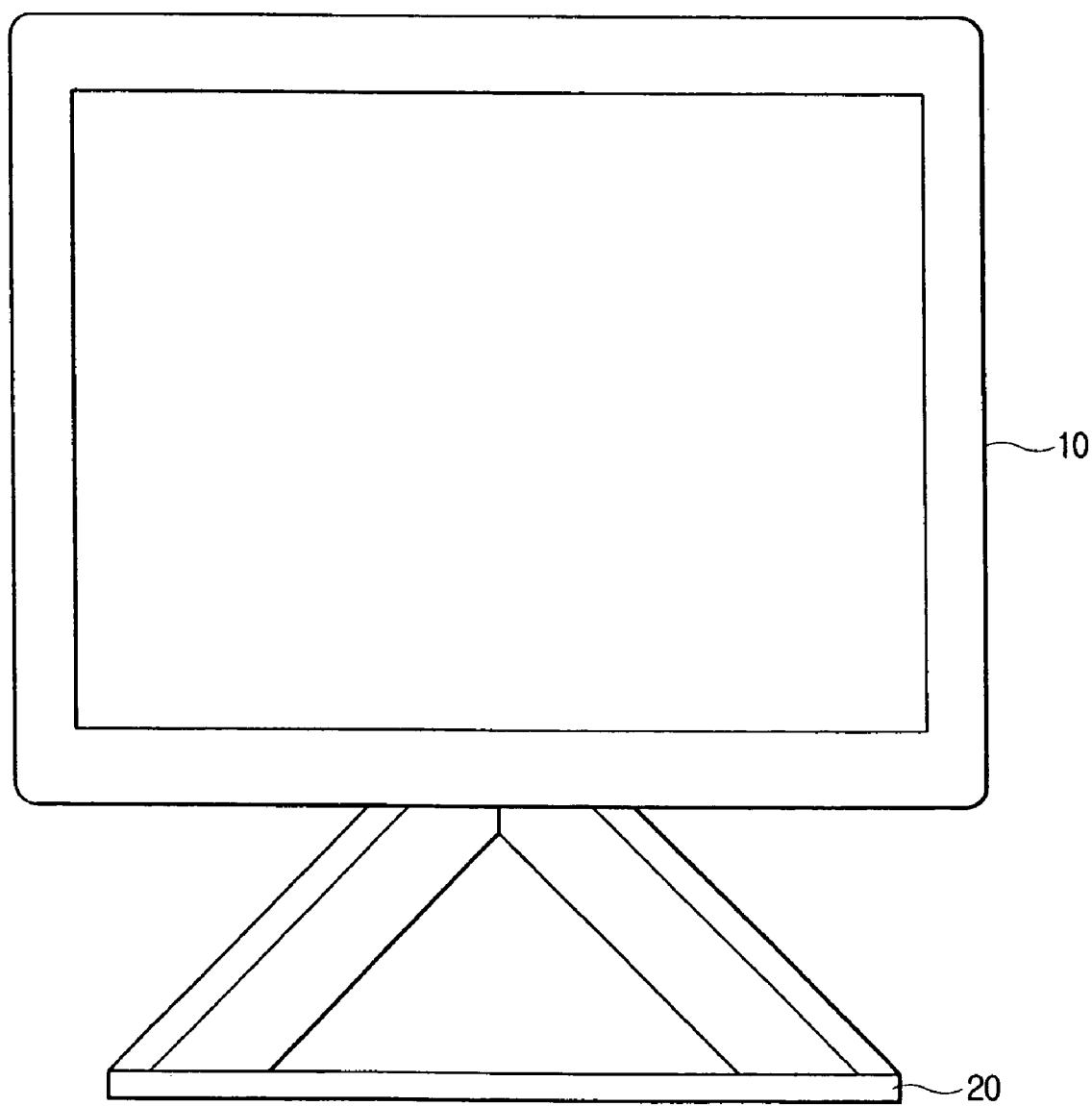
FIGS. 8A to 10B are views illustrating a pivoting operation of the monitor of FIGS. 1–4.
Figure 8B:
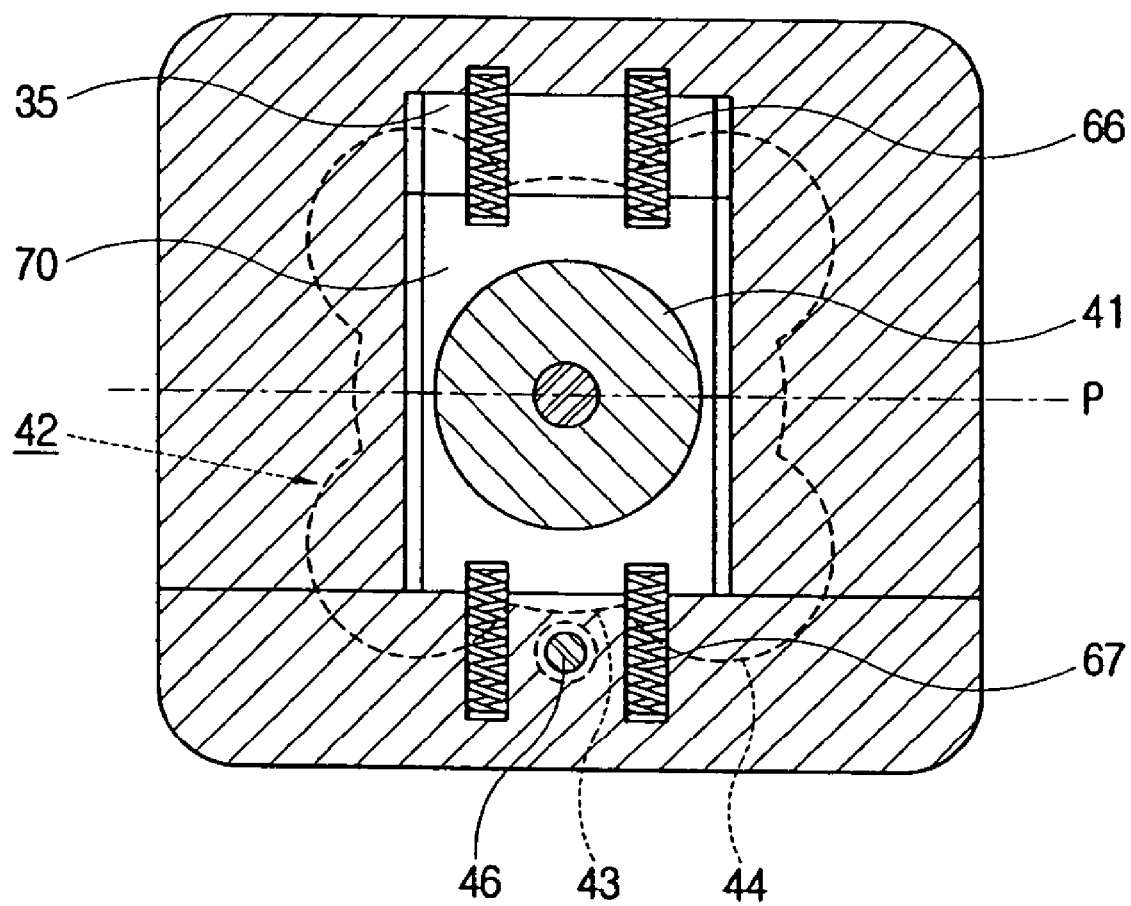

When the monitor body 10 is positioned as shown in FIG. 8A, the roller 46 is in contact with one of the recess 43 of the pivoting bracket 42 as shown in FIG. 8B and the first pair of coil springs 66 presses the top portion of the guide bracket 70 downward, thereby making the center of the pivoting shaft 41 be positioned at a position "P."

Figure 9A:
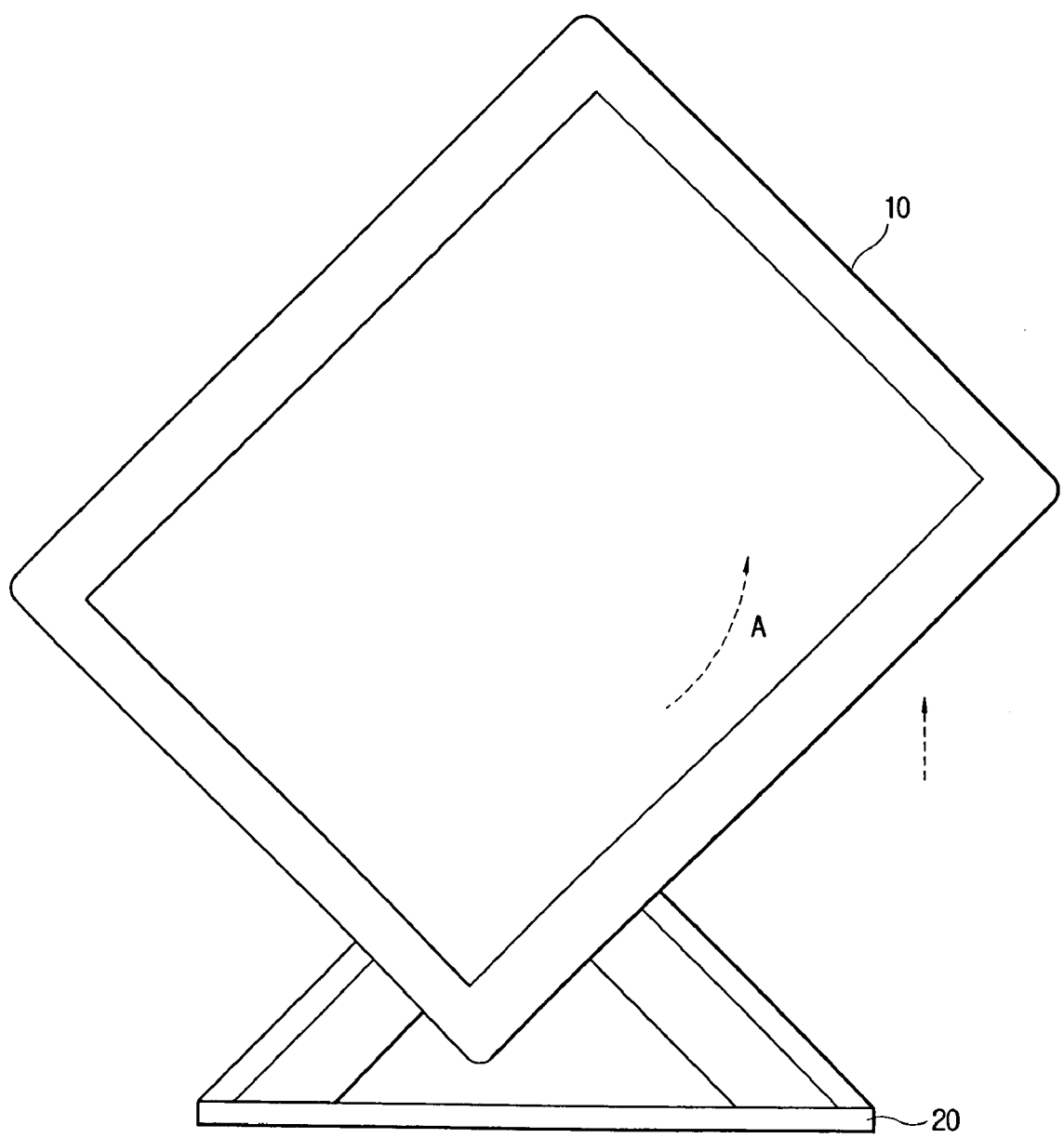
Figure 9B:
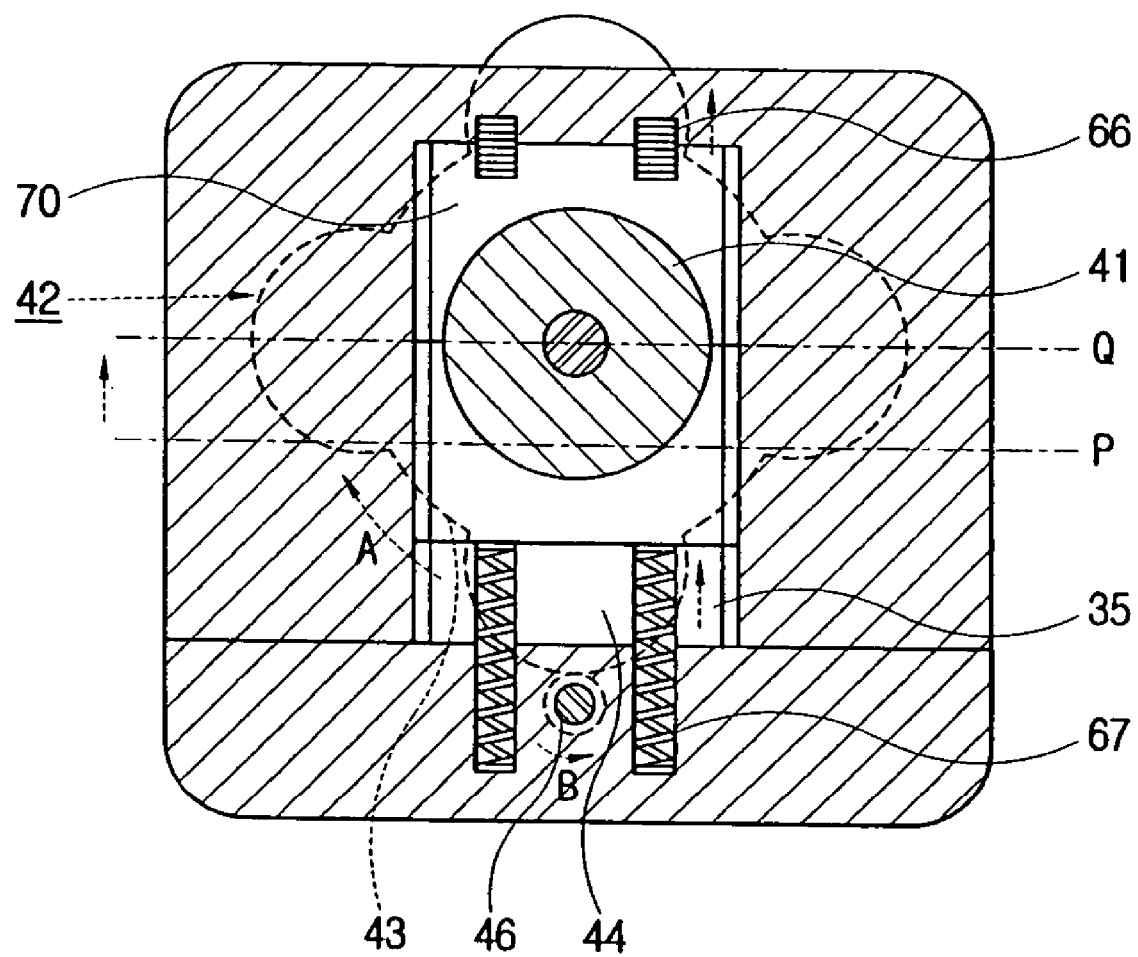
Figure 10A:
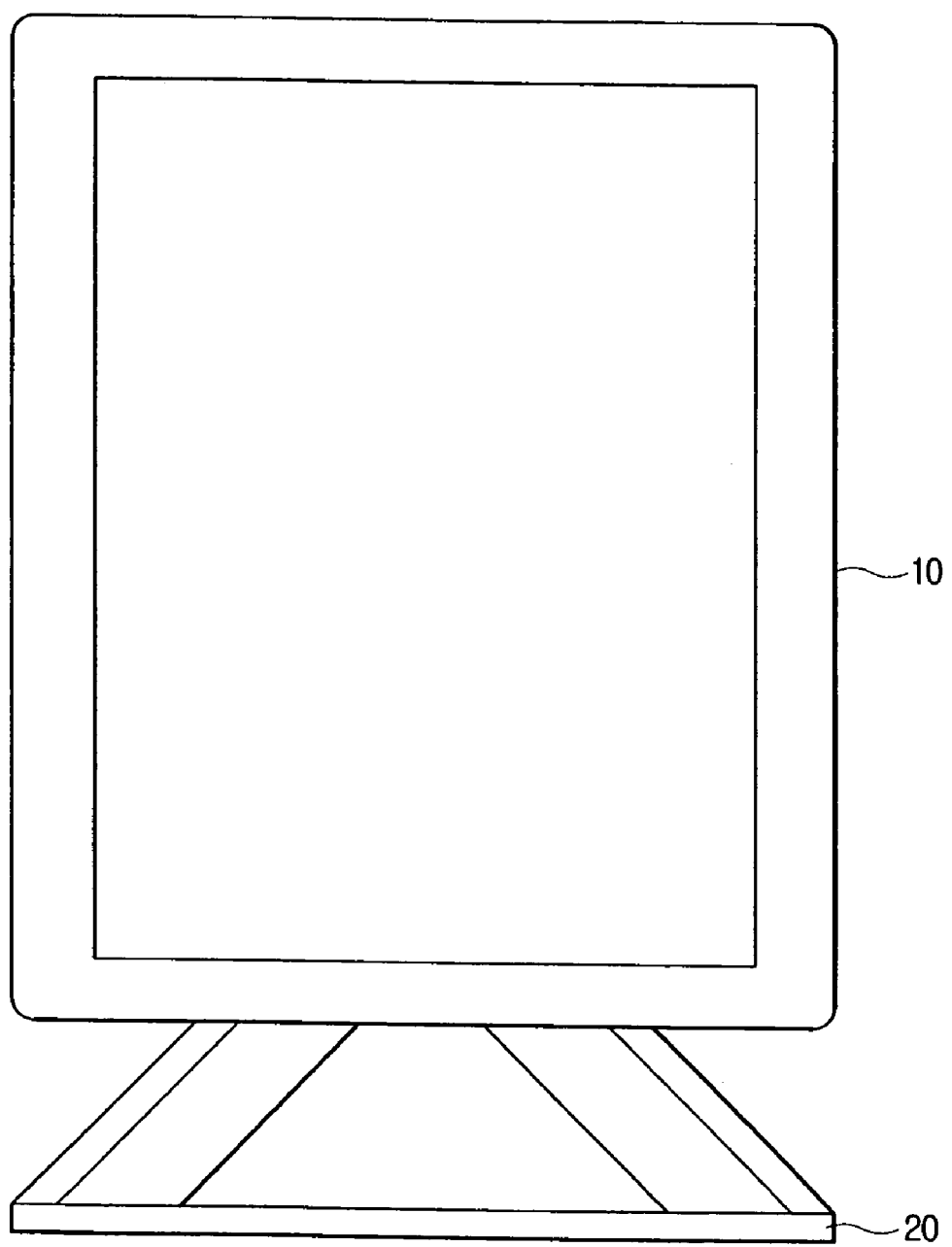
Figure 10B:
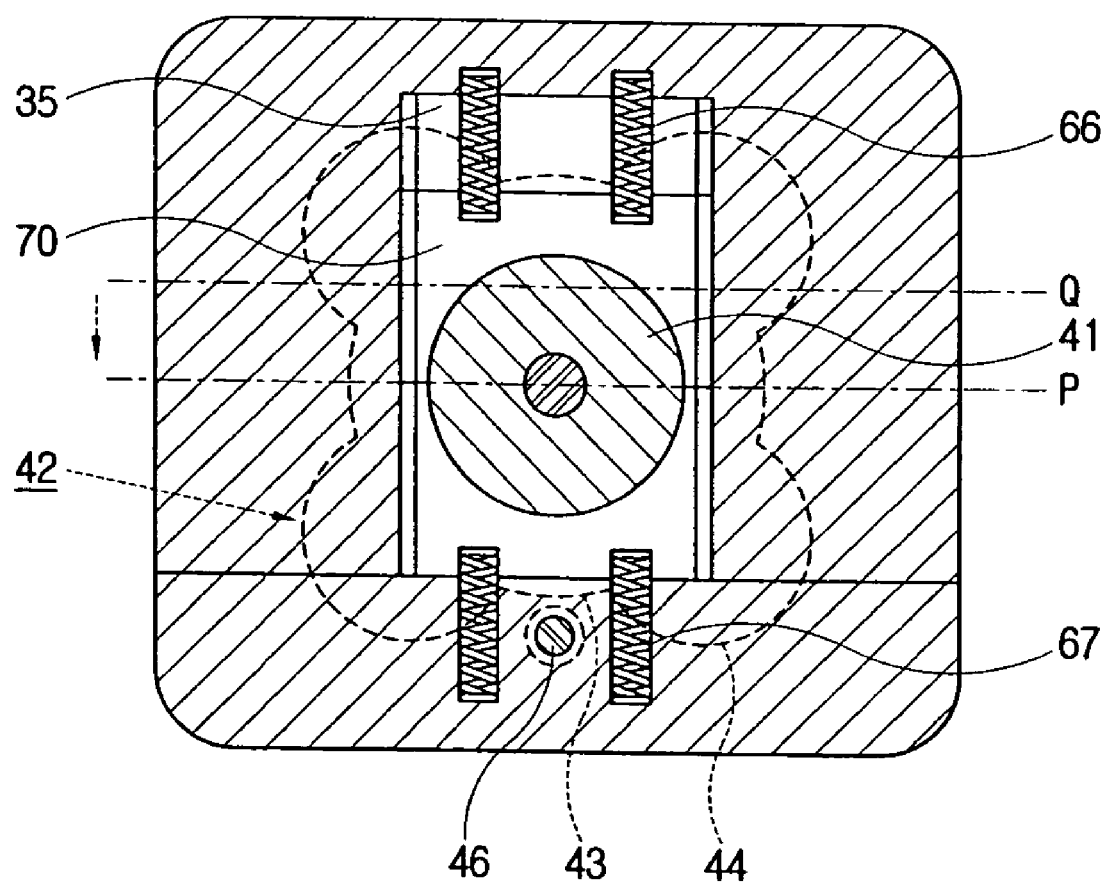

When the user wishes to position the monitor body 10 as shown in FIG. 10A while the monitor body 10 is positioned as shown in FIG. 8A, the user can rotate the monitor body 10 in an "A" direction. When the monitor body 10 is pivoted approximately 45° relative to the base member, as shown in FIG. 9A, the pivoting bracket 42 is rotated to the "A" direction on the pivoting shaft 41 as shown in FIG. 9B. When the pivoting bracket 42 is rotated in the "A" direction, the roller 46 is rotated in a "B" direction due to a rotation force of the protrusion 44 and the center of the pivoting shaft 41 is moved upward to a position "Q" from the position "P." The second pair of coil springs 67 presses the guide bracket 70 upward to cause the guide bracket to move upward within the guide bracket accommodating part 35, and the first pair of coil springs 66 is compressed by the upward force of the second pair of coil springs 67. As shown in FIGS. 9A and 9B, since an angle between the recess 43 and the protrusion 44 is approximately 45°, the monitor body 10 is pivoted about 45° relative to the base member 20.

The user then continues to rotate the monitor body 10 in the "A" direction. The pivoting bracket 42 is further rotated in the "A" direction relative to the pivoting shaft 41. When the pivoting bracket 42 is further rotated in the "A" direction, the roller 46 is further rotated in the "B" direction due to the rotation force of the protrusion 44, and the center of the pivoting shaft 41 is moved downward to the position "P" from the position "Q." The first pair of coil springs 66 presses the guide bracket 70 downward to move the guide bracket 70 downward within the guide bracket accommodating part 35 and the second pair of coil springs 67 is compressed by the downward force of the pair of first coil springs 66.

When the monitor body 10 is pivoted with respect to the base member 20 relative to the pivoting shaft 41, the monitor body 10 can pivot without contacting the base member, thereby preventing the monitor body 10 and the base member from being damaged.

In the exemplary embodiments described above, rails 71 are provided in the guide bracket 70 and rail accommodating grooves 36 are provided in the guide bracket accommodating part 35. Alternatively, rail accommodating grooves may be provided in the guide bracket 70 and rails may be provided in the guide bracket accommodating part 35.

As described above, the present general inventive concept provides a monitor capable of preventing a collision between the monitor body and the base member when the monitor body is pivoted with respect to the base member.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A monitor having a monitor body to form a picture thereon and a base member to support the monitor body, comprising:
   a tilting unit provided between the monitor body and the base member to tiltably support the monitor body with respect to the base member;
   a pivoting unit provided between the monitor body and the tilting unit to pivotably support the monitor body with respect to the base member; and
   a slide supporting part provided between the pivoting unit and the tilting unit to slidably support the pivoting unit with respect to the tilting unit and to move the monitor body with respect to the base member according to a pivoting movement of the monitor body.

2. The monitor as claimed in claim 1, wherein the pivoting unit comprises:
a pivoting shaft coupled to the tilting unit; and
a pivoting bracket, one side of which is coupled to the monitor body and another side of which is rotatably coupled to the pivoting shaft.

3. The monitor as claimed in claim 2, wherein the slide supporting part comprises a pivoting shaft accommodating hole formed on the tilting unit to accommodate the pivoting shaft therein, the pivoting shaft accommodating hole being elongated.

4. The monitor as claimed in claim 3, wherein the pivoting bracket comprises a plurality of recesses and protrusions provided radially therein, and a roller provided therein to contact the recesses and the protrusions to slidably support the pivoting shaft with respect to the pivoting shaft accommodating hole.

5. The monitor as claimed in claim 4, further comprising:
a spring member to provide an elastic force to the pivoting shaft when the pivoting bracket is in contact with the roller.

6. The monitor as claimed in claim 4, wherein the recesses and the protrusions are respectively provided in four, and each recess is formed between adjacent protrusions.

7. The monitor as claimed in claim 4, wherein the tilting unit comprises:
a first tilting bracket coupled to the base member;
a second tilting bracket coupled to the pivoting shaft, on which the pivoting shaft accommodating hole is formed; and
a tilting shaft coupled between the first tilting bracket and the second tilting bracket to tiltably support the second tilting bracket with respect to the first tilting bracket.

8. The monitor as claimed in claim 7, further comprising:
a guide bracket coupled to the pivoting shaft to slide integrally with the pivoting shaft and to guide the pivoting shaft to the pivoting shaft accommodating hole.

9. The monitor as claimed in claim 8, wherein the second titling bracket comprises a guide bracket accommodating part provided adjacently to the pivoting shaft accommodating hole to accommodate the guide bracket therein.

10. The monitor as claimed in claim 9, further comprising:
a rail provided in one of the guide bracket and the guide bracket accommodating part; and
a rail accommodating hole provided in the other one of the guide bracket and the guide bracket accommodating part to accommodate the rail therein.

11. The monitor as claimed in claim 3, wherein the tilting unit comprises:
a first tilting bracket coupled to the base member;
a second tilting bracket coupled to the pivoting shaft, on which the pivoting shaft accommodating hole is formed; and
a tilting shaft coupled between the first tilting bracket and the second tilting bracket to tiltably support the second tilting bracket with respect to the first tilting bracket.

12. The monitor as claimed in claim 11, further comprising:
a guide bracket coupled to the pivoting shaft to slide integrally with the pivoting shaft and to guide the pivoting shaft to the pivoting shaft accommodating hole.

13. The monitor as claimed in claim 12, wherein the second titling bracket comprises a guide bracket accommodating part provided adjacently to the pivoting shaft accommodating hole to accommodate the guide bracket therein.

14. The monitor as claimed in claim 13, further comprising:
a rail provided in one of the guide bracket and the guide bracket accommodating part; and
a rail accommodating hole provided in the other one of the guide bracket and the guide bracket accommodating part to accommodate the rail therein.

15. A display apparatus comprising:
a display main body to display an image thereon;
a base to support the display main body; and
a supporting unit to connected to the display main body and the base, the supporting unit comprising:
a pivoting unit to pivot the display main body with respect to the base, and
a pivoting adjustment unit to raise and lower the display main body with respect to the base according to a pivoting position of the display main body when the display main body is pivoted by the pivoting unit.

16. The display apparatus of claim 15, wherein the pivoting position of the display main body comprises an angle of rotation of the display main body with respect to an axis extending perpendicularly outward from a center of the display main body, and when the angle of rotation is 45°, the display main body is raised a maximum amount by the pivoting adjustment unit.

17. The display apparatus as claimed in claim 15, wherein pivoting unit comprises:
a pivoting shaft; and
a pivoting bracket coupled to the display main body to rotate around the pivoting shaft to pivot the display main body with respect to the base.

18. The display apparatus as claimed in claim 17, wherein the pivoting adjustment unit comprises:
a guide portion to allow the pivoting shaft to move upward and downward to raise and lower the display main body according to the rotation of the pivoting bracket; and
a roller to contact the pivoting bracket when the pivoting bracket rotates around the pivoting shaft.

19. The display apparatus as claimed in claim 18, wherein the pivoting bracket comprises protrusions corresponding to the pivoting position of the display main unit, and recesses disposed between the protrusions.

20. The display apparatus as claimed in claim 19, wherein when the roller of the pivoting adjustment unit contacts the protrusions, the roller causes the pivoting shaft to move upward within the guide portion to raise the display main body, and when the roller contacts the recesses, the guide portion allows the pivoting shaft to move downward to lower the display main body by a weight of the display main body.

* * * * *